United States Patent [19]

Markham

[11] 3,972,842

[45] Aug. 3, 1976

[54] RECLAMATION OF FLUOROPOLYMERS

[75] Inventor: John Lucien Markham, Birmingham, England

[73] Assignee: Dunlop Limited, London, England

[22] Filed: Apr. 22, 1974

[21] Appl. No.: 462,951

[30] Foreign Application Priority Data
May 2, 1973 United Kingdom............... 20822/73

[52] U.S. Cl................................ 260/2.3; 260/42.27; 260/80.77; 260/96 D; 260/87.7; 260/899; 526/17; 526/54; 526/250; 528/480; 528/502
[51] Int. Cl.².................. C08J 11/04; C08F 214/22; C08F 214/28; C08F 214/26
[58] Field of Search............... 260/2.3, 87.5 A, 96 D

[56] References Cited
UNITED STATES PATENTS
3,243,411  3/1966  Tawney et al. ............... 260/87.5 A

*Primary Examiner*—Wilbert J. Briggs, Sr.
*Attorney, Agent, or Firm*—Stevens, Davis, Miller & Mosher

[57] ABSTRACT

Polyhydroxy-cured vinylidene fluoride fluoropolymer is reclaimed by masticating the polymer to at least the stage of initial break-down of the cured polymer network, treating the masticated polymer with hot concentrated nitric acid to cause the polymer to swell and then removing the acid. The polymer is suitably an elastomer and may be scrap polymer.

15 Claims, No Drawings

RECLAMATION OF FLUOROPOLYMERS

This invention relates to the reclamation of fluoropolymers and in particular to the reclamation of fluoropolymers which have been cured using an organic polyhydroxy curative.

The curing of fluoropolymers and the manufacture of articles of cured fluoropolymers sometimes results in a small proportion of unwanted product, i.e. scrap. This scrap may be the result of a faulty cure owing to, for example, nonuniform mixing of the ingredients of the curable polymer composition, or a faulty moulding operation, or it may merely be spew or flash produced during moulding. Scrap cured fluoropolymer has limited usefulness and it would be desirable to convert this scrap into a state in which it could be re-used similarly to non-cured, or virgin, polymer, i.e. to reclaim the polymer. Owing to the variety of curatives used in the curing of fluoropolymers it is found that a method which is suitable for reclaiming fluoropolymers which have been cured using one class of curatives is not necessarily suitable for reclaiming fluoropolymers which have been cured using another class of curatives. The present invention provides a method of reclaiming fluoropolymers which have been cured using an organic polyhydroxy curative.

According to the present invention, a method of reclaiming a vinylidene fluoride fluoropolymer which has been cured using an organic polyhydroxy curative comprises masticating the fluoropolymer to at least the stage at which break-down of the cured polymer network is initiated, treating the masticated polymer with concentrated nitric acid at an elevated temperature to cause the polymer to swell, and subsequently removing the nitric acid from the swollen polymer.

It is found that in order to achieve adequate reclamation it is essential for the cured polymer to be masticated. It is not sufficient for the polymer to be merely cut into small pieces by a sharp edge. Moreover, the mastication must be continued until at least the stage at which the cured polymer network has begun to break down and, preferably, the mastication is continued after this stage of initial breakdown. The stage of initial break-down of the cured polymer network, i.e. the stage at which the strain on the polymer network exceeds the tensile properties of the polymer, is indicated by a visible change in the physical appearance of the polymer from a smooth texture characteristic of cured vinylidene fluoride polymers to a coarse texture. This change will be readily recognized by those familiar with the art of rubber compounding. The texture of the cured polymer after mastication will usually take the form of a crumb, a crumb-like sheet, a lace-like sheet, a banded sheet or a coarse-grained sheet, depending on the type of mechanical device employed for mastication, the conditions of mastication e.g. temperature and shear rate, and the stage at which mastication is stopped. The mastication may be achieved by devices which are conventionally used for mastication and mixing of rubbers, such as a rubber mill, an internal mixer (e.g. a Banbury mixer) or a continuous mixer (e.g. a Transfermix mixer). The mastication is suitably performed at a high shear, i.e. a shear rate of more than 10 seconds$^{-1}$, especially when the masticating device is a mill.

The fluoropolymers which may be reclaimed according to the present invention are, in general, fluoroelastomers and, suitably, are copolymers of vinylidene fluoride with one or more other fluorine-containing olefin monomers, for example hexafluoropropene, chlorotrifluoroethylene, tetrafluoroethylene and pentafluoropropenes.

The scrap cured fluoropolymers available for reclaiming are usually in the press-cured state but may sometimes be in the post-cured state. The method of the present invention is particularly suitable for reclaiming press-cured fluoropolymer.

The cured fluoropolymers are those which have been cured using an organic polyhydroxy curative. Such curatives are nucleophilic and are usually dihydroxy compounds. The polyhydroxy curative, as employed, may have free hydroxyl groups or it may be employed as its alkali metal or alkaline earth metal salt, and it is preferably employed in a basic system. Examples of organic polyhydroxy curatives are aromatic compounds such as hydroquinone, 2,2-bis(4-phenylol)propane (i.e. bis-phenol A), 2,2-bis(4-phenylol) hexafluoropropane (i.e. bis-phenol AF), resorcinol, 1,7-dihydroxynaphthalene, 4,4'-dihydroxydiphenyl, 4,4'-dihydroxystilbene, 2,6-dihydroxyanthracene and the alkali metal and alkaline earth metal salts of these compounds, and $C_1$ to $C_6$ aliphatic diols, for example 1,3-propane diol and 1,6-hexane diol. These curatives are usually employed in conjunction with a cure accelerator, for example a basic metal oxide such as MgO, CaO or ZnO, a strong organic base such as N,N'-tetrameth-yl-N''-lauryl guanidine, or a cyclic "crown" polyether such as 2,5,8,15,18,21-hexaoxatricyclo (20.4.0.0)hexacosane in a weakly basic medium.

The scrap polymers usually contain additional ingredients such as carbon black. The reclamation of the polymer is not normally affected by the presence of these ingredients.

The concentrated nitric acid treatment is preferably performed using boiling nitric acid since this requires only a short treatment time. Lower treatment temperatures may be employed, but as the temperature is decreased the required time of treatment is increased. For instance, at a low temperature of around 30°–40°C., some polymers require a treatment time of more than six months to achieve adequate reclamation. Accordingly, based on practicable treatment times, the temperature is preferably at least 100°C.

The nitric acid has the effect of converting the polymer into a state in which it can be re-processed and recured as a virgin, i.e. non-cured, polymer. Surprisingly, it is also found that the acid has a swelling effect on the polymer and therefore a separate swelling agent or solvent is not required.

After the nitric acid treatment, the acid may be removed from the swollen polymer by neutralisation followed by washing with water. Squeezing the polymer in the presence of the neutralising agent is often desirable in order to attain thorough neutralisation. Neutralisation may be carried out conveniently by the addition of a suitable neutralising agent, such as sodium carbonate, to the swollen polymer during mastication in an internal mixer. Washing and drying can also be undertaken in an internal mixer, although water spraying (in a shower cabinet) followed by oven-drying may be used. Neutralisation may alternatively be effected by boiling the acid-treated polymer with water several times for up to 10 minutes before steeping the polymer in a dilute solution of ammonia for up to 24 hours at room temperature.

Advantageously, the reclaimed fluoropolymer may be masticated again before being re-cured.

The invention is illustrated in the following Examples.

EXAMPLE I

2 Kg of industrial scrap vinylidene fluoride/hexafluoropropene copolymer (DuPont Viton A-35) compound which had been press-cured using hydroquinone (DuPont Diak 5) and DuPont Diak 6 (active ingredient N,N'-tetramethylene-N''-lauryl guanidine), were masticated on a cool 30.5 cm (12 inch) two-roll mill at a friction ratio of 1.2:1 to form thin crumb-like sheets which were then boiled with 12.5 liters of concentrated nitric acid for 6 hours. Acid-free polymer was obtained by the steps of removing supernatant acid, immersing the polymer in 12.5 liters of boiling water for 30 minutes before allowing to cool to room temperature and allowing to stand in water for 16 hours, masticating the polymer in admixture with soda ash in an internal mixer, washing the polymer with water to neutrality, and drying the polymer in an oven.

100 parts by weight of the reclaimed polymer (containing residual carbon black) were compounded with 3 parts by weight of N,N'-dicinnamylidene-1,6-hexanediamine (DuPont Diak 3) and 20 parts by weight of magnesium oxide on a cool two-roll mill at a friction ratio of 1.2:1 for about 15 minutes and were then press-cured for 15 minutes at 166°C. and post-cured for 24 hours at 200°C. The percentage insolubility and swelling volume (i.e. swollen polymer volume divided by unswollen polymer volume), in methyl ethyl ketone, of the polymer at various stages are shown below:

| Polymer | % Insolubility | Swelling Volume |
|---|---|---|
| Scrap | 99.0 | 3.60 |
| Milled scrap | 88.6 | 7.27 |
| Reclaim | 64.9 | 22.8 |
| Milled reclaim | 59.0 | 30.1 |
| Press-cured reclaim | 97.0 | 3.83 |
| Post-cured reclaim | 98.6 | 3.23 |

These results indicate that a re-processible reclaim was produced.

Compounds having the formulations shown below were made up, press-cured for 15 minutes at 166°C. and post-cured for 24 hours at 200°C.

| | A | B |
|---|---|---|
| Virgin Viton B | 100 | 50 |
| Reclaim of this Example | 0 | 50 |
| MgO (Maglite Y) | 20 | 20 |
| Medium thermal carbon black | 20 | 0 |
| Talc | 10 | 0 |
| N,N'-dicinnamylidene-1,6-hexanediamine (Diak 3) | 3 | 3 |

Viton B is the DuPont trade name of a vinylidene fluoride/hexafluoropropene/tetrafluoroethylene copolymer.

Physical properties of the cured compounds are given below.

| | A | B |
|---|---|---|
| Hardness (IRHD) | 80 | 69 |
| Specific gravity | 1.97 | 1.93 |
| Tensile strength (MN/m$^2$) | 12.1 | 12.1 |
| Elongation at break (%) | 150 | 180 |
| Brittle point (°C.) | −45 | −62 |
| Dry heat ageing for 70 hours at 250°C: | | |
| Change in hardness (IRHD) | −1 | +15 |
| Change in volume (%) | −2.9 | −5.9 |
| Steeping in ASTM fluid No. 3 for 70 hours at 150°C: | | |
| Change in hardness (IRHD) | −1 | 0 |
| Change in volume (%) | +1.8 | +1.9 |
| Dry heat ageing, bent around a 2.54 cm diameter mandrel: | | |
| Time to first cracks at 250°C. (hours) | 1000+ | 1000+ |
| Time to first cracks at 300°C. (hours) | 67 | 48 |
| Compression set (%): | | |
| Compression at 20°C., release at about 20°C. | 30 | 26 |
| Compression at 100°C., release at about 20°C. | 57 | 59 |
| Compression at 100°C., release at about 100°C. | 29 | 34 |
| Compression at 200°C., release at about 20°C | 79 | 80 |
| Compression at 200°C., release at about 200°C. | 52 | 54 |

The compression set was measured in accordance with B.S. 903 (A6) using polymer discs having a diameter of 1.43 cm and a thickness of 0.64 cm. The compression was 25 percent for 24 hours. The "release" temperature is the temperature at which the compression was removed from the disc. The set of the discs released at 100°C. and 200°C. was measured 30 minutes after release from the compression and the set of the discs released at 20°C. was measured 1 minute after release from the compression.

"IRHD" = international rubber hardness degrees.

These physical properties are consistent with the lower level of filler in the reclaim compound and fall within the range expected for cured fluoroelastomers.

EXAMPLE II 2.5 Kg of industrial scrap press-cured fluoroelastomer available under the DuPont trade name Viton E-60C (believed to be a copolymer comprising a preponderance of vinylidene fluoride and hexafluoropropene units, blended with a curative being 2,2-bis(4-phenylol)hexafluoropropane or a metal salt of it) were masticated on a cool 30.5 cm (12 inch) two-roll mill at a friction ratio of 1.2:1 to form coarse crumb-like sheets which were then immersed in boiling concentrated nitric acid for 6 hours. Acid-free polymer was obtained as described in Example I, the oven-drying being at 120°C for 70 hours.

Compounds having the formulations given below were made up, press-cured for 5.5 minutes at 182.5°C. and post-cured for 24 hours at 250°C.

| | A | B | C | D |
|---|---|---|---|---|
| Virgin Viton E-60C | 100 | 90 | 80 | 70 |
| Reclaim of this Example | 0 | 10 | 20 | 30 |
| MgO (Maglite D) | 4 | 4 | 4 | 4 |
| Ca(OH)$_2$ | 6 | 6 | 6 | 6 |
| Medium thermal carbon black | 25 | 25 | 25 | 25 |

Physical properties of the cured compounds are given below.

| | A | B | C | D |
|---|---|---|---|---|
| Hardness (IRHD) | 72 | 71 | 73 | 71 |
| Density (g.cm$^{-3}$) | 1.85 | 1.85 | 1.85 | 1.85 |

|  | A | B | C | D |
|---|---|---|---|---|
| Tensile strength (MN/m²) | 10.6 | 10.6 | 13.9 | 12.8 |
| Elongation at break (%) | 200 | 200 | 190 | 230 |
| Brittle point (°C) | −48 | −49 | −50 | −49 |
| Dry heat ageing for 70 hours at 250°C: | | | | |
| Change in hardness (IRHD) | +1.0 | +3.0 | 0 | +2.0 |
| Change in volume (%) | −1.7 | −2.0 | −1.6 | −1.8 |
| Change in weight (%) | −1.4 | −1.8 | −2.5 | −2.7 |
| Steeping in ASTM fluid No. 3 for 70 hours at 150°C: | | | | |
| Change in hardness (IRHD) | −1.0 | −1.0 | −1.0 | −1.0 |
| Change in volume (%) | +1.6 | +1.4 | +1.7 | +1.5 |
| Steeping in Aromatic Test Fluid (30/70) toluene/iso-octane) for 70 hours at 40°C: | | | | |
| Change in hardness (IRHD) | −1.0 | −4.0 | −3.0 | −3.0 |
| Change in volume (%) | +1.9 | +3.4 | +3.1 | +2.9 |
| Dry heat ageing, bent around a 2.54 cm diameter mandrel: | | | | |
| Time to first cracks at 250°C. (hours) | 1000+ | 1000+ | 1000+ | 1000+ |

EXAMPLE III 100 g of scrap press-cured Viton E-60C were reclaimed as described in Example II. 100 parts by weight of the reclaim (containing residual carbon black) were blended with 15 parts by weight of MgO (Maglite Y) and 3 parts by weight of Diak 3 on a cool 15.3 cm (6 inch) two-roll mill at a friction ratio of 1.2:1 and the resulting compound was press-cured for 10 minutes at 174°C. and post-cured for 24 hours at 250°C. The percentage insolubility and swelling volume, in methyl ethyl ketone, of the polymer at various stages are shown below.

| Polymer | % Insolubility | Swelling Volume |
|---|---|---|
| Scrap | 99.8 | 4.08 |
| Milled scrap | 94.7 | 4.67 |
| Reclaim | 80.1 | 8.18 |
| Milled reclaim | 76.0 | 12.9 |
| Press-cured reclaim | 93.3 | 4.76 |
| Post-cured reclaim | 98.1 | 3.23 |

EXAMPLE IV

Two 20 g samples of scrap Diak 5/Diak 6 press-cured Viton A-35 were masticated under identical conditions on a cool 15.3 cm (6 inch) two-roll mill at a friction ratio of 1.2:1 for 5 and 20 minutes respectively. The 5 minute mastication resulted in a rough coarse-grained sheet and the 20 minute mastication resulted in a smoother sheet. The masticated samples were treated with concentrated nitric acid and recovered in acid-free condition as described in Example I.

100 parts by weight of each of the resulting reclaims were compounded with 0.8 part by weight of Diak 5, 2.4 parts by weight of Diak 6 and 4 parts by weight of magnesium oxide, on a cool 15.3 cm (6 inch) two-roll mill at a friction ratio of 1.2:1, and the compounds were then press-cured for 15 minutes at 171°C. and post-cured for 24 hours at 250°C.

The percentage insolubility and swelling volume, in methyl ethyl ketone, of the polymer samples at various stages are shown below.

| Polymer | % Insolubility | | Swelling Volume | |
|---|---|---|---|---|
|  | 5-minute | 20-minute | 5-minute | 20-minute |
| Scrap | 100 | 100 | 3.55 | 3.55 |
| Milled scrap | 90.3 | 87.0 | 7.37 | 9.9 |
| Reclaim | 69.5 | 58.8 | 17.5 | 23.3 |
| Milled reclaim | 60.0 | soluble | 24.0 | soluble |
| Press-cured reclaim | 96.0 | 81.0 | 7.1 | 17.3 |
| Post-cured reclaim | 100 | 100 | 3.70 | 5.31 |

These results indicate the increased reclamation achieved at the longer mastication time.

Having now described my invention — what I claim is:

1. A method of reclaiming a vinylidene fluoride fluoropolymer which has been cured using an organic polyhydroxy curative, which comprises masticating the fluoropolymer to at least the stage at which breakdown of the cured polymer network is initiated, treating the masticated polymer with concentrated nitric acid at an elevated temperature to cause the polymer to swell, and subsequently removing the nitric acid from the swollen polymer.

2. A method according to claim 1 wherein the fluoropolymer is a fluoroelastomer.

3. A method according to claim 1 wherein the fluoropolymer is a copolymer of vinylidene fluoride with at least one other fluorine-containing olefin monomer.

4. A method according to claim 3 wherein the one or more other fluorine-containing monomers are selected from the group consisting of hexafluoropropene, chlorotrifluoroethylene, tetrafluoroethylene and pentafluoropropenes.

5. A method according to claim 1 wherein the fluoropolymer is in the press-cured state.

6. A method according to claim 1 wherein the nitric acid is removed from the swollen polymer by neutralisation followed by washing with water.

7. A method according to claim 1 wherein the nitric acid treatment is performed at a temperature of at least 100°C.

8. A method according to claim 1 wherein the nitric acid treatment is performed using boiling nitric acid.

9. A method according to claim 1 wherein the mastication is continued after the stage of initial break-down of the cured polymer network.

10. A method according to claim 1 wherein the mastication is achieved by means of a device selected from the group consisting of rubber mills, internal mixers and continuous mixers.

11. A method according to claim 1 wherein the mastication is performed at a shear rate of more than 10 seconds$^{-1}$.

12. A method according to claim 1 wherein the organic polyhydroxy curative is a dihydroxy compound.

13. A method according to claim 1 wherein the organic polyhydroxy curative is an aromatic compound selected from the group consisting of hydroquinone, 2,2-bis(4-phenylol) propane, 2,2-bis(4-phenylol) hexafluoropropane, resorcinol, 1,7-dihydroxynaphthalene, 4,4′-dihydroxydiphenyl, 4,4′-dihydroxystilbene, 2,6-dihydroxyanthracene and their alkali metal and alkaline earth metal salts.

14. A method according to claim 1 wherein the organic polyhydroxy curative is a $C_1$ to $C_6$ aliphatic diol.

15. A method according to claim 1 wherein the reclaimed polymer is masticated before being re-cured.

* * * * *